Figure 1:
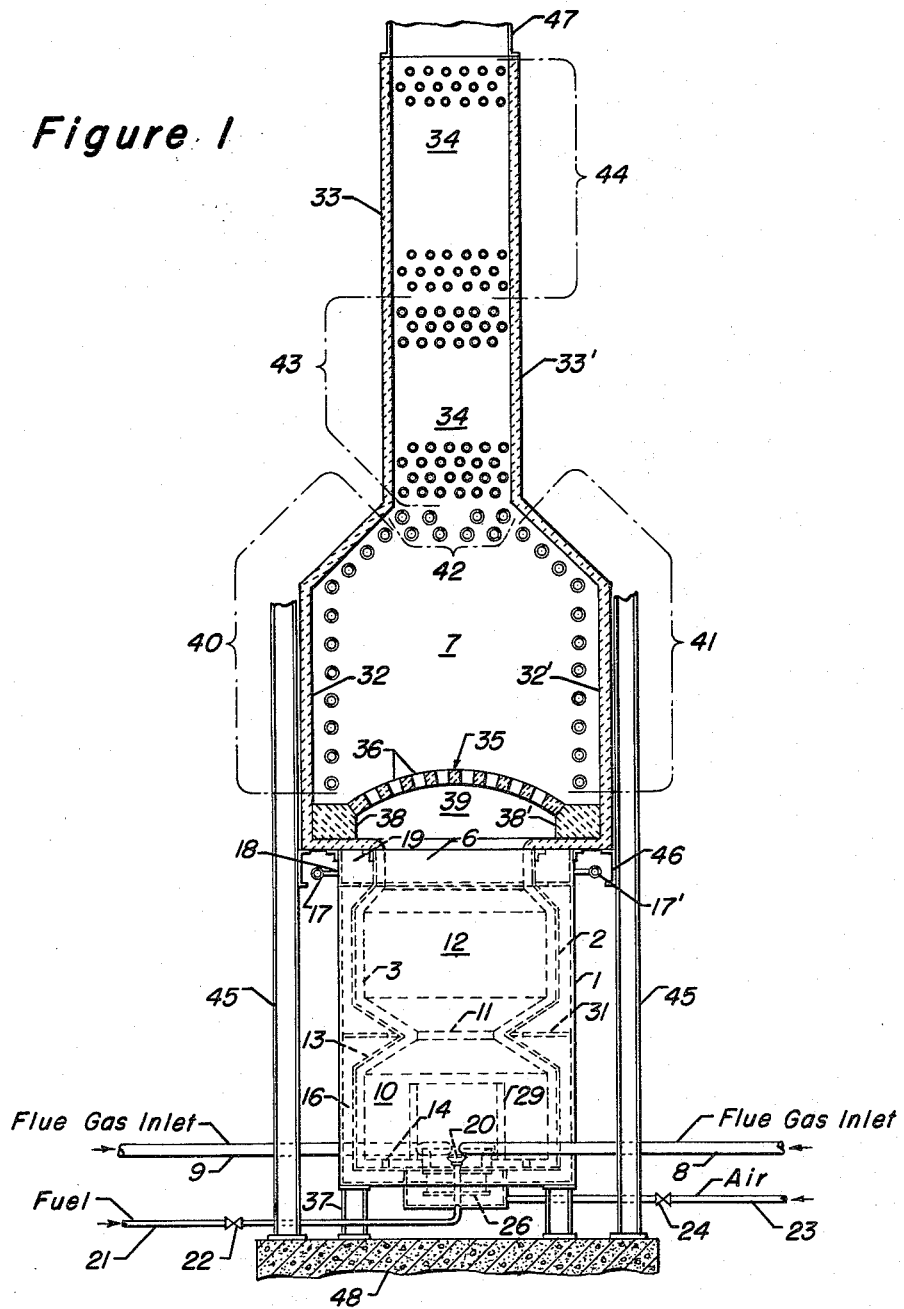

July 6, 1965    M. W. BARNES    3,192,905
COMBINED CARBON MONOXIDE OXIDIZER AND FLUID HEATER
Filed Dec. 30, 1963    2 Sheets-Sheet 1

INVENTOR:
Marion W. Barnes

BY: James R. Hootson Jr.
Philip T. Liggett
ATTORNEYS

July 6, 1965 M. W. BARNES 3,192,905
COMBINED CARBON MONOXIDE OXIDIZER AND FLUID HEATER
Filed Dec. 30, 1963 2 Sheets-Sheet 2
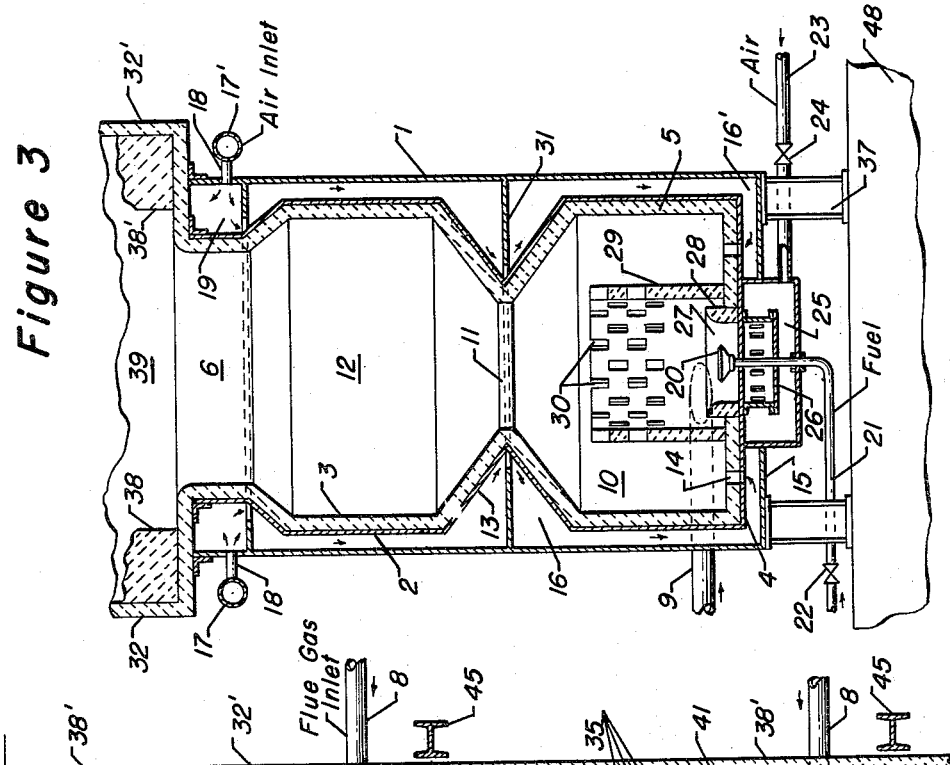
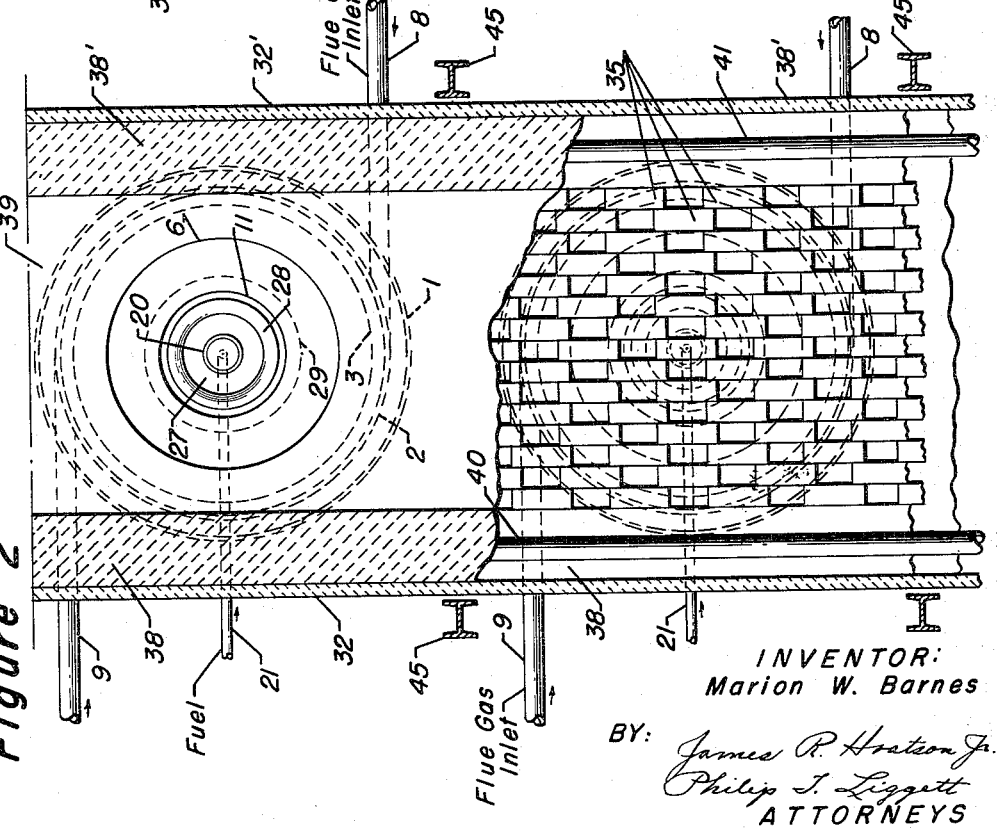
INVENTOR:
Marion W. Barnes
BY:
ATTORNEYS

United States Patent Office 3,192,905
Patented July 6, 1965

3,192,905
COMBINED CARBON MONOXIDE OXIDIZER AND FLUID HEATER
Marion W. Barnes, Glenview, Ill., assignor to Universal Oil Products Company, Des Plaines, Ill., a corporation of Delaware
Filed Dec. 30, 1963, Ser. No. 334,469
2 Claims. (Cl. 122—7)

This application is a continuation-in-part of my previously filed application Serial No. 236,099 filed November 7, 1962.

This application relates particularly to an improved combined apparatus for effecting the combustion of a gaseous fuel containing a small percentage of combustible constituents, such as a flue gas stream with unburned carbon monoxide, and, in addition, for utilizing the resultant sensible heat in the heating of one or more fluid streams.

Various furnace installations and processing chambers have flue gas and waste gas streams which carry carbon monoxide or other small percentages of combustibles so that there may be an advantageous recovery of heat from such streams. For example, a substantially oxygen free flue gas stream from a regenerator of a gas-oil catalytic cracking unit may have from 6.0% to 8.0% carbon monoxide (CO) content resulting from the carbon burning step carried out therein. In the fluidized catalytic cracking process or in moving bed catalytic operations, as associated with petroleum processing, there is a catalytic cracking of the gas-oil stream in the presence of particles of catalyst at a temperature in the 900° to 1050° F. range within a reaction zone to effect the breaking of the heavier hydrocarbon molecules into more desirable components. The contact effects a carbon deposition on the catalyst particles such that the carbonized particles continuously pass to a regeneration zone where they are contacted with air to effect the oxidation and removal of the deposit from the particles. Reactivated particles, with carbon deposition substantially eliminated, are periodically or continuously returned to the reaction zone at a high temperature, say of the order of 1000° to 1150° F. such that the cracking reaction may be continuously carried out in the separate confined reaction zone. In this type of operation, the effluent gas stream from the regenerator is substantially oxygen free, but may contain the aforesaid 6.0 to 8.0 percent carbon monoxide which may be made available as heat. This gas stream may also be of the order of 1100° F. so that it retains a large quantity of sensible heat.

While the gas oxidizer portion of the present combined apparatus is particularly adapted to the handling of a regenerator effluent gas, there is no intent to limit such portion to using a regenerator flue gas stream only inasmuch as any carbon monoxide containing stream, or stream containing entrained gaseous combustibles, may be accommodated in the apparatus to provide for the recovery of usable heat. As used herein, the term "flue gas" relates generically to any stream carrying burnable components from which the heat of combustion may be made available.

In order to obtain substantially complete combustion in the waste gas stream, oxygen must be provided and introduced in a manner to effect intimate contact with the combustible molecules at a sufficiently high temperature and for a sufficient length of time. Thus, there is necessarily (1) turbulence for mixing, (2) high temperature to effect ignition and (3) time and space to complete the oxidation reaction. These three conditions are obtained in an optimum manner by the use of one or more cylindrically shaped combustion chambers, each of which has a circular lower section with tangentially connected gas inlet ports, an intermediate venturi-like restricted diameter mixing section and a circular upper combustion section.

The discharge of hot combustion gases from a confined cylindrical oxidation zone, or zones, necessarily encounter the problem of effecting uniform heat distribution into a fluid heating chamber. It is thus a feature of the present invention to provide a plenum section and a checkerwork refractory floor or partition in connection therewith which functions in an optimum manner to more uniformly distribute the resultant heat to the fluid heating zone.

Specifically, it may be stated that one principal object of this invention is to provide an upwardly arched checkerwork refractory floor or partition above a plenum zone as a transition section between one or more confined flue gas combustion units and the fluid heating section of the combined apparatus, such that the fluid carrying conduits receive both uniform radiant heat and uniform convected heat.

It is not intended to limit the design and arrangement of the heating chamber to any one configuration or to any one tube bank arrangement. For example, fluid conduits or tube banks may be arranged entirely around the walls of a substantially square fluid heating chamber superposed above a single gas oxidizing unit, with one large arched grid-work floor, or partition, being used above the outlet of the plenum section and the flue gas oxidizer unit. However, more generally, the heating chamber will be constructed in an elongated rectangular form and will have fluid conduits arranged in opposing tube banks along the longer walls of a lower radiant heating section and one or more banks of fluid conduits postioned in compact arrangements within a restricted cross-sectional area upper convection section. Thus, preferably, a plurality of flue gas burning units are spaced in a longitudinal row, or rows, beneath the lower radiant heating section and an elongated hot gas plenum section, superimposed by the arched checkerwork refractory, will serve to interconnect the plurality of gas oxidizer chambers such that the resulting high temperature combustion gases will be uniformly distributed upwardly therefrom. At the same time, the high temperature gases will effect the high temperature heating of the checkerwork refractory so as to cause the latter to provide substantially uniform radiant heating to adjacent banks of fluid conduits extending longitudinally parallel therewith.

In one embodiment the present invention provides an apparatus for oxidizing residual combustibles in a flue gas stream and for effecting the heating of fluids, which comprises in combination, a superposed fluid heater chamber having a lower radiant heating section and an upper convection heating section with flue gas discharge means therefrom, at least one bank of fluid conduits along wall portions of said lower radiant heating section and at least one bank of fluid conduits within the upper convection heating section, an upwardly arched checkerwork refractory floor for said heater chamber, with such floor defining the upper discharge portion of a laterally extending hot gas plenum section positioned therebelow and providing uniform radiant heat and hot gas distribution into said lower radiant heating section, and at least one flue gas oxidizing unit positioned below and connective with said plenum section, with each oxidizing unit including a refractory lined cylindrical combustion chamber having a lower flue gas inlet section, an upper gas combustion section with a hot gas outlet connecting to and discharging into said plenum section, and a restricted diameter gas mixing zone positioned intermediately between said gas inlet section and said upper combustion section, fuel burner means extending axially upwardly through the lower end of said gas inlet section producing a high temperature flame and radiant heat therein, air inlet ports through the lower end of said gas inlet section spaced around said fuel burner means, and flue gas inlet port means connecting tangentially with the interior lower portion of said gas inlet section, whereby heat and air will mix with said tangentially introduced flue gas stream and the resultant heated mixture and oxidized gases will swirl centrifugally upwardly through said lower section and pass upwardly through said superposed restricted and combustion sections and thence to said arched checkerwork refractory floor.

As will be pointed out more specifically with reference to the drawing, it is also a feature of the improved construction and arrangement of the present flue gas burner-fluid heater apparatus to utilize an internal cylindrical checkerwork refractory wall around the fuel gas burner means within the lower flue gas inlet section such that there is a rapid uniform mixing and transfer of heat to the flue gas-air streams being introduced to the oxidizing chamber. The cylindrically formed checkerwork wall provides a high temperature refractory mass or "heat-sink" which substantially precludes loss of CO ignition within the flue gas stream. At the same time, hot combustion gases from the fuel burner means can intermix directly with the feed stream and the air stream by radial flow outwardly through the checkerwork wall as well as by downstream mixing above the top of the wall and in the venturi-like mixing zone.

Reference to the accompanying drawing and the following description in connection therewith will serve to more fully set forth the construction and arrangement of the present combined flue gas burner-fluid heater apparatus as well as point out advantageous features in connection therewith.

FIGURE 1 of the drawing is a sectional elevational view through the combined apparatus.

FIGURE 2 of the drawing is a partial sectional plan view at the zone of the arched floor section, between the spaced flue gas oxidizing chambers and the superposed fluid heating chamber.

FIGURE 3 of the drawing is a partial sectional elevational view showing specifically the design and arrangement of the lower waste gas oxidizer portion of the apparatus.

Referring now more specifically to FIGURES 1 and 3 of the drawing, which show elevational views of the apparatus, there is shown one of a plurality of lower cylindrical form waste gas burner chambers having an outer shell 1 spaced from the actual outer chamber wall 2 that is provided with an internal refractory liner material 3. The combustion chamber wall 2 joins with a lower floor or bottom plate 4 having refractory liner material or insulation 5. The upper end of the oxidizer unit is open, utilizing a passageway 6, that is defined by the upper end portion of the liner 3, to permit the discharge of a hot gas stream. The CO containing flue gas charge stream, or other waste gas stream, is introduced to the oxidizing chamber through tangentially positioned inlet conduits 8 and 9, as best shown in FIGURES 2 and 3, at a level just above the refractory floor 5 of the chamber. The result of the tangential introduction of the flue gas stream is a centrifugal swirl of the gases around the inside of inlet zone 10 to a restricted diameter mixing section 11 and thence into an enlarged diameter combustion zone 12 which in turn connects by way of the passageway 6 to the superimposed heating chamber. A swaged center portion 13 of the outer wall 2 of the combustion chamber, together with the restricted diameter portion of the interior wall 3 provides the smaller diameter high velocity mixing section 11 leading to the combustion section 12.

Air or oxygen in an amount greater than the stoichiometric amount to provide complete combustion of the CO content of the charge stream is introduced vertically upwardly through the lower end of the combustion chamber by way of spaced air inlet ports 14 such that there is a substantially uniform introduction of oxygen into admixture with the upwardly moving centrifugal stream of flue gases. A spaced lower end plate 15, joining with the outer shell 1, provides a continuing air passageway 16 that communicates with the spaced air inlets 14 from the annular air passageway 16 between spaced shells 1 and 2. In accordance with the present embodiment, a cool air stream is introduced by way of manifolds 17 and 17' and spaced radial inlet conduits 18 to the upper annular manifold zone 19 encompassing the combustion chamber 12 externally of the passageway section 6. Thus, the cool air stream passes in a downwardly moving column through annular zone 16 to the lower end zone 16' of the unit and thence upwardly through distribution passageways 14 into the lower internal inlet zone 10 of the apparatus. The downwardly moving annular column of cool air passes at a relatively high velocity and in direct heat exchange relationship with the outside of the combustion shell 2 so as to provide a cooling of the latter and to permit a minimum of internal insulation 3 in both the inlet and combustion sections of the apparatus. A horizontal baffle plate 31 projects inwardly from the shell 1 and serves to channel the air stream adjacent the swaged section of the combustion chamber shell 2.

In the present embodiment, the autogeneous temperature required to sustain combustion of the CO, and/or other entrained combustible components in the flue gas stream, is provided by a burner nozzle 20 which is in turn supplied with a fuel through line 21 and a control valve 22. A rich fuel such as methane or natural gas may be introduced through line 21 in a controlled manner to effect a high temperature flame pattern which will radiate outwardly and upwardly through the lower inlet section of the unit. Air for the burning of the methane at the burner nozzle 20 is provided through line 23, having valve 24, that connects with a cylindrical air manifold section 25. The latter is spaced from and encompasses a perforate circular baffle member 26 around conduit 21 and below nozzle 20. There is thus provided an internal air passageway section 27 in axial alignment with an open-ended cylindrical burner-block 28. The upper end of block 28 is in turn encompassed by a cylindrical wall 29 of checkerwork refractory. The latter terminates short of the mixing section 11 such that there is adequate passageway for the flue gas stream to swirl centrifugally around the checkerwork wall 29 in section 10 thence into the mixing zone 11 and upwardly to the combustion zone 12. The high temperature flame from the burner nozzle 20 impinges upon the interior of the checkerwork wall 29, as well as outwardly through openings 30, to provide a temperature sufficient to heat the flue gas-air stream to the order of 1500° F. or more and insure ignition and combustion of the entrained CO.

In a preferred operation, the emthane or other rich fuel charged through line 21 to burner nozzle 20, together with at least about 125 percent of the theoretcial amount of air required to burn the CO in the flue gas stream, is discharged into the interior of burner block 28 and the refractory checkerwork wall 29. The combustion of the rich fuel thus continues and is completed in the cylindrical-form refractory wall 29 to result in the discharge of high temperature flame and heat through the multiplicity of openings 30, as well as from the upper end portion thereof, to provide mixing of high temperature gases with the flue gas-air stream swirling upwardly from the bottom portion of the inlet section 10. After the unit has been in operation, the incoming flue gas stream and air stream are heated by radiation and by contact with the refractory checkerwork wall 29, as well as with hot gases and flame from the burner nozze 20, such that loss of CO ignition is substantially precluded. Actually, after combustion of the CO is well established outside of wall 29, there may be sufficient heat retained by such wall and from the burner flame on the interior of the wall 29, such that there may be an appreciable reduction in the quantity of the rich gas stream being supplied to the nozzle 20. In any event, it may be noted that the present construction and arrangement provides separate fuel and air lines 21 and 23, respectively, together with the air manifold sections 25 and 27 to permit the wide regulation and control of the temperature released from the burner nozzle 20 into the lower end of the unit.

Each of the waste gas oxidizing units have their upper discharge passageways 6 arranged to discharge in turn into an elongated longitudinal hot gas plenum section 39. The latter thus serves to collect and uniformly redistribute the resulting high temperature gas streams from the oxidizing chambers upwardly into a superposed fluid heating chamber. Referring particularly to FIGURE 1 of the drawing, there will be noted that there is a superposed rectangular form of heater chamber having lower side walls 32 and 32' defining a lower radiant heating setcion 7 and upper more closely spaced side walls 33 and 33'; which define an upper convection section 34. The upper end of the heater chamber is covered with a breeching or gas outlet duct 47 suitable for collecting the cooled flue gas stream and for transferring the latter to suitable stack means not shown in the drawing.

Preferably, for an elongated rectangular form of heater chamber there will be two or more spaced CO burning units utilized below the heater chamber, such as indicated diagrammatically in the partial sectional plan view of FIGURE 2. A lower upwardly arched checkerwork refractory floor section 35 is provided for the lower radiant heating section of the heater chamber, with such checkerwork floor section in effect serving as a perforate upper discharge portion of the elongated hot gas plenum section 39. The arched floor section 35 is provided with a predetermined number of openings 36 to effect a uniform dispersion of the hot gases over the entire floor area and a resutling substantially uniform distribution of such hot gases into the lower radiant heating section as well as to the upper convection section of the fluid heating chamber. In other words, the open area of the checkerwork floor section 35 is designed to provide a slight pressure drop or retardation of flow for the hot gas streams from the burner units to insure a substantially uniform stream flow throughout the entire heater chamber. Also, the cross sectional area of the plenum section 39 is designed to be approximately equivalent to one-half the cross sectional area of a hot gas discharge passageway 6 of a single gas oxidizing chamber, whereby the resulting hot gas flow from the plurality of gas oxidizer units will be substantialy uniformly discharged into and redistributed by the plenum section longitudinally and upwardly through the checkerwork floor section 35.

As best illustrated in FIGURES 1 and 2 of the drawing, the arching floor section 35 is supported by and springs upwardly from the longitudinal refractory haunches or floor sections 38 and 38' which in turn extend along the respective lower side wall portions 32 and 32' of the heater chamber.

Various means may be provided for structurally supporting the superposed heating chamber and the CO burner units. However, in accordanace with the present diagrammatic embodiment, there is indicated a foundation 48 with short column supports 37 spaced and arranged to support each of the lower CO burner units, while vertical columns 45 together with horizontal beams 46, as part of a vertical framing system, provide means for supporting the superposed updraft form of fluid heating chamber.

There may, of course, be various positions and arrangements for the fluid conduits or tube banks within the heating chamber to obtain the desired transfer of usable heat to one or more fluid streams. The embodiment of the present diagrammatic drawing indicates that wall tubes 40 and 41 are positioned to obtain radiant heat from the checkerwork floor section 35 and from the high temperature combustion gases passing therethrough to the lower section 7. Shock tubes 42 are positioned in a conventional manner to receive both radiant and convection heat at the zone where the chamber narrows into the upper convection section 34. Tube bank 43 is arranged in the lower high temperature portion of the convection section while still another tube bank 44 is indicated as being arranged in the upper low temperature portion of the convection section 34 to absorb heat prior to the discharge of the gases to the breeching and stack.

Various flow arrangements may also be utilized within and between tube banks or between various portions of a tube bank. A single fluid stream may pass serially downwardly through the convection section and through the two portions of the radiant heating section, or alternatively, may be heated in the upper and lower convection sections and still another fluid stream introduced into the radiant section. In another arrangement, as for example in a refinery installation, the upper low temperature convection section may be utilized to generate steam while the lower high temperature convection section and the radiant heating section may be utilized for the heating of hydrocarbon streams.

In the actual operation of the combined waste gas oxidizer-fluid heating apparatus, the flue gas stream is introduced tangentially through the lower lines 8 and 9 into the lower inlet section 10 such that the stream is centrifugally mixed with an air stream being introduced by way of inlet manifolds 17 and 17', passageway 16 and air inlet ports 14. High temperature flame and hot gases are distributed by means of burner nozzle 20, from fuel and air inlet lines 21 and 23 respectively, against and through the cylindrical checkerwork wall 29. Resulting flue gases, heated air and high temperature burner gases are mixed in the upper portion of section 10 and mixing zone 11, to thus pass into the upper combustion zone 12 for the completion of the oxidation of the entrained CO or other combustibles. The resulting individual high temperature gas streams are subsequently introduced into the plenum section 39 for redistribution into the heater chamber.

Generally, the hot gas streams entering the plenum section 39 and passing upwardly through the checkerwork refractory floor section 35 will have a high temperature in the 1500° F. to 1900° F. range such that the checkerwork floor section will provide in turn a glowing refractory mass capable of giving high temperature uniform radiant heat to the fluid conduits maintained in the lower radiant heating section 7 of the superposed heater chamber. The use of the upwardly arching shape for the lower floor section provides a more efficient heat radiation to fluid conduits which are arranged along the side walls of the lower radiant heating section, than to merely introduce the hot gases upwardly toward the convection section. Thus, in an elongated rectangular form of heater chamber, the crest of the arch of the checkerwork refractory should extend longitudinally parallel with the side walls of the heater chamber and with the adjacent fluid conduits. It may be pointed out, however, that an upwardly arching floor section is also effective in transmitting radiant heat to wall tubes or conduits which may be placed in vertical arrangements along the opposing side walls of the heater chamber, and it is not intended to limit the design and arrangement to the use of horizontal tubes or any one configuration of tube banks within the fluid heating chamber.

I claim as my invention:

1. A combined apparatus for oxidizing residual combustibles in a flue gas stream and for effecting the heating of fluids, which comprises in combination, a superposed elongated fluid heater chamber having a lower radiant heating section and an upper restricted cross-sectional area convection heating section with flue gas discharge means therefrom, at least one bank of fluid conduits extending along each of the elongated wall portions of said lower radiant heating sections and at least one bank of fluid conduits extending longitudinally and parallel with the elongated wall portions of said upper convection heating section, an upwardly arching refractory checkerwork floor section for said heater chamber having the crest of the arch thereof extend centrally between and longitudinally parallel with the elongated walls of the lower radiant heating section, a plurality of flue gas oxidizing chambers positioned at spaced longitudinal distances below said heater chamber and said arched checkerwork refractory floor, an elongated hot gas plenum section also positioned below the latter and above said gas oxidizing chambers to interconnect each of the latter whereby hot gases therefrom may be uniformly distributed upwardly through the checkerwork refractory floor section, each flue gas oxidizing chamber of the plurality thereof including an upper cylindrical combustion section, a lower cylindrical flue gas inlet section and an intermediate restricted diameter gas mixing zone, said upper gas combustion section having a hot gas outlet connecting to and discharging into said elongated plenum section, fuel burner means extending axially upwardly through the lower end of the said gas inlet section producing a high temperature flame and radiant heat therein, air inlet ports extending through the lower end of said gas inlet section and spaced around said fuel burner means, and flue gas inlet port means connecting tangentially with the interior lower end portion of said gas inlet section, whereby heat and air will mix with said tangentially introduced flue gas stream and the resultant heated mixture will swirl centrifugally through said lower section to have hot oxidized gases pass upwardly through said superposed mixing zone and said combustion section and thence to said elongated plenum section and said arched checkerwork refractory floor section of the heater chamber.

2. The apparatus of claim 1 further characterized in that said cross sectional area of said elongated plenum section and the open area portions of said checkerwork refractory floor section are restricted in an amount providing a controlled low pressure drop for the hot gas flow therethrough and effect a resulting substantially uniform heating of the refractory floor section and uniform upward hot gas distribution into the superposed heater chamber.

References Cited by the Examiner
UNITED STATES PATENTS

| | | | |
|---|---|---|---|
| 1,730,440 | 10/29 | Smith. | |
| 2,101,835 | 12/37 | Alcorn | 122—356 X |
| 2,129,589 | 9/38 | Praeger | 122—356 X |
| 2,140,278 | 12/38 | Barnes | 122—356 |
| 2,625,916 | 1/53 | Barnes | 122—356 X |
| 2,753,925 | 7/56 | Campbell et al. | 158—1 |
| 2,790,838 | 4/57 | Schrader | 23—277 X |
| 2,840,049 | 6/58 | Durham | 122—333 |
| 3,007,512 | 11/61 | TeNuyl et al. | |

PERCY L. PATRICK, *Primary Examiner.*
KENNETH W. SPRAGUE, *Examiner.*